(12) United States Patent
Rulevich et al.

(10) Patent No.: US 6,608,687 B1
(45) Date of Patent: Aug. 19, 2003

(54) ON LINE MEASURING OF GOLF BALL CENTERS

(75) Inventors: John Rulevich, Wrentham, MA (US); Ajay P. Vora, Randolph, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 10/142,530

(22) Filed: May 10, 2002

(51) Int. Cl.[7] .............................................. G01B 11/00
(52) U.S. Cl. ...................................... 356/601; 356/625
(58) Field of Search ........................ 356/601, 614–615, 356/625, 640, 237.1–237.3; 382/107, 154, 289; 250/330, 341.6, 341.8; 101/483; 426/237

(56) References Cited

U.S. PATENT DOCUMENTS

| | | | | |
|---|---|---|---|---|
| 4,091,060 A | * | 5/1978 | Cater et al. ................. | 264/40.1 |
| 4,259,013 A | * | 3/1981 | Faxvog et al. ............ | 356/237.1 |
| 4,839,181 A | * | 6/1989 | MacMurray et al. ........ | 426/237 |
| 5,383,022 A | | 1/1995 | Kaser .......................... | 356/640 |
| 5,450,206 A | * | 9/1995 | Caillat et al. ............. | 356/237.3 |
| 5,606,534 A | | 2/1997 | Stringer et al. ............. | 367/128 |
| 5,632,205 A | * | 5/1997 | Gordon et al. .............. | 101/483 |
| 5,699,161 A | | 12/1997 | Woodworth ................. | 356/628 |
| 5,703,687 A | * | 12/1997 | Kumagai et al. ........... | 356/426 |
| 5,850,370 A | | 12/1998 | Stringer et al. ............. | 367/128 |
| 5,923,428 A | | 7/1999 | Woodworth ................. | 356/623 |
| 5,966,213 A | | 10/1999 | Shimosaka et al. ......... | 356/376 |
| 6,042,483 A | * | 3/2000 | Katayama .................... | 473/199 |
| 6,094,269 A | | 7/2000 | Ben-Dove et al. .......... | 356/623 |
| 6,100,986 A | | 8/2000 | Rydningen | |
| 6,137,577 A | | 10/2000 | Woodworth ................. | 356/623 |
| 6,169,290 B1 | | 1/2001 | Rosberg et al. .......... | 250/559.3 |
| 6,172,754 B1 | | 1/2001 | Niebuhr | |
| 6,181,424 B1 | | 1/2001 | Okabayashi et al. ........ | 356/376 |
| 6,226,416 B1 | * | 5/2001 | Ohshima et al. ............ | 382/289 |
| 6,271,520 B1 | * | 8/2001 | Tao et al. .................... | 250/330 |

FOREIGN PATENT DOCUMENTS

GB     2 228 315    * 8/1990

* cited by examiner

*Primary Examiner*—Frank G. Font
*Assistant Examiner*—Sang H. Nguyen
(74) *Attorney, Agent, or Firm*—D. Michael Burns

(57) ABSTRACT

A method and an apparatus for measuring spherical objects, such as golf ball cores, on line. The spherical objects are automatically moved through a measuring field and are positioned co-linear to an axis of a plane drawn by a high frequency scanning laser, wherein the center of each object intersects with the laser beam. The objects are constantly rotated as they translate through the measuring field such that a plurality of planes are scanned, and the resulting scans are sent offline to a controller for analysis.

In another embodiment, the spherical objects are measured by having multiple CCD or PMT vision cameras take a number of object images that are therein sent offline to a controller for analysis.

20 Claims, 4 Drawing Sheets

ON LINE MEASURING OF GOLF BALL CENTERS

FIELD OF THE INVENTION

This invention relates generally to the on line measurement of three dimensional objects, in particular, golf ball components.

BACKGROUND OF THE INVENTION

One of the critical features of golf ball construction is the "roundness" or "trueness" of the various components comprising a golf ball, such as centers, cores, and the ball itself. It is critical that the dimensions of the balls, cores, and centers are equal in all axes and planes.

Common methods of measuring dimensions of golf balls and golf ball components are offline, bench-type instruments. One example of such an instrument currently in use is a strain gauge-type instrument. This instrument allows manufacturers to sample the dimensions of a few golf balls, cores, and centers from a large quantity, to verify that the dimensions are of the correct magnitude. The strain gauge instrument encompasses a series of pins and calipers that are translated towards a ball disposed between them. Once each pin touches the surface of the ball, the distance each pin has traveled is compared to the distance it should have traveled, assuming an ideally-constructed object. This, and other offline/bench methods, are slow, measure very few data points, and are generally limited to measuring dimensions at a single axis or plane of the ball.

This type of measuring, while accurate, fails to completely measure the entire ball. When dealing with a spherical object, there are effectively, an infinite number of axes or planes through which a diameter, for example, could be measured. If a series of pins/calipers are translated to touch a spherical surface, one is limited to one axes/plane per two pins. As with any spherical object, such as a golf ball, the diameter might be identical for a number of planes and different for another plane, not measured. This out-of-round plane creates a problem, particularly in the golf ball industry, for obvious reasons.

Not only is a method needed for measuring a large number of planes/axes of golf balls and golf ball components, one that allows sampling of the maximum number of balls is even more preferred. Simply selecting a few golf balls from a large sample allows for a large margin of error. There is thus a need for a fast, online measuring method that measures a plurality of axes of a golf ball.

SUMMARY OF THE INVENTION

The present invention is directed to a method for monitoring a spherical object such as a golf ball or a golf ball core, by providing a measuring field in which the spherical objects are fed into while being rotated as they translate in the field. A laser generating emitter and receiver determine the size of the field in which the center of a continuous wave laser beam intersects with the center of the core. The spheres rotate in a forward direction as they translate forward by gravity on a pair of rails. Simultaneously, they are subjected to a perpendicular rotation that is caused by the turning of the rails. The resultant action upon the spheres provides for a plurality of diameters to be measured and the resulting data fed to a controller for Quality Control analysis.

An embodiment of the invention would have a plurality of vision cameras that would be in addition to or in lieu of the laser generating equipment. The cameras would be oriented perpendicular to the axis of translation of the spheres and would take photo-images of the rotating spheres on CCD or other type photo detectors. The images would be sent to a controller for processing.

The present invention provides for a mechanism that includes a track having rotating rails, whereby the spheres are rotated in a generally perpendicular rotation to the inherent rolling direction as they translate through the measuring field. The means for translating them through the field can be any conventional usage such as gravity or use of an augur to spirally feed the spheres into the field. Each sphere will have about 100 to 200 different diameter planes measured as it moves through the measurement field.

DETAILED DESCRIPTION OF THE INVENTION

Figure 1:
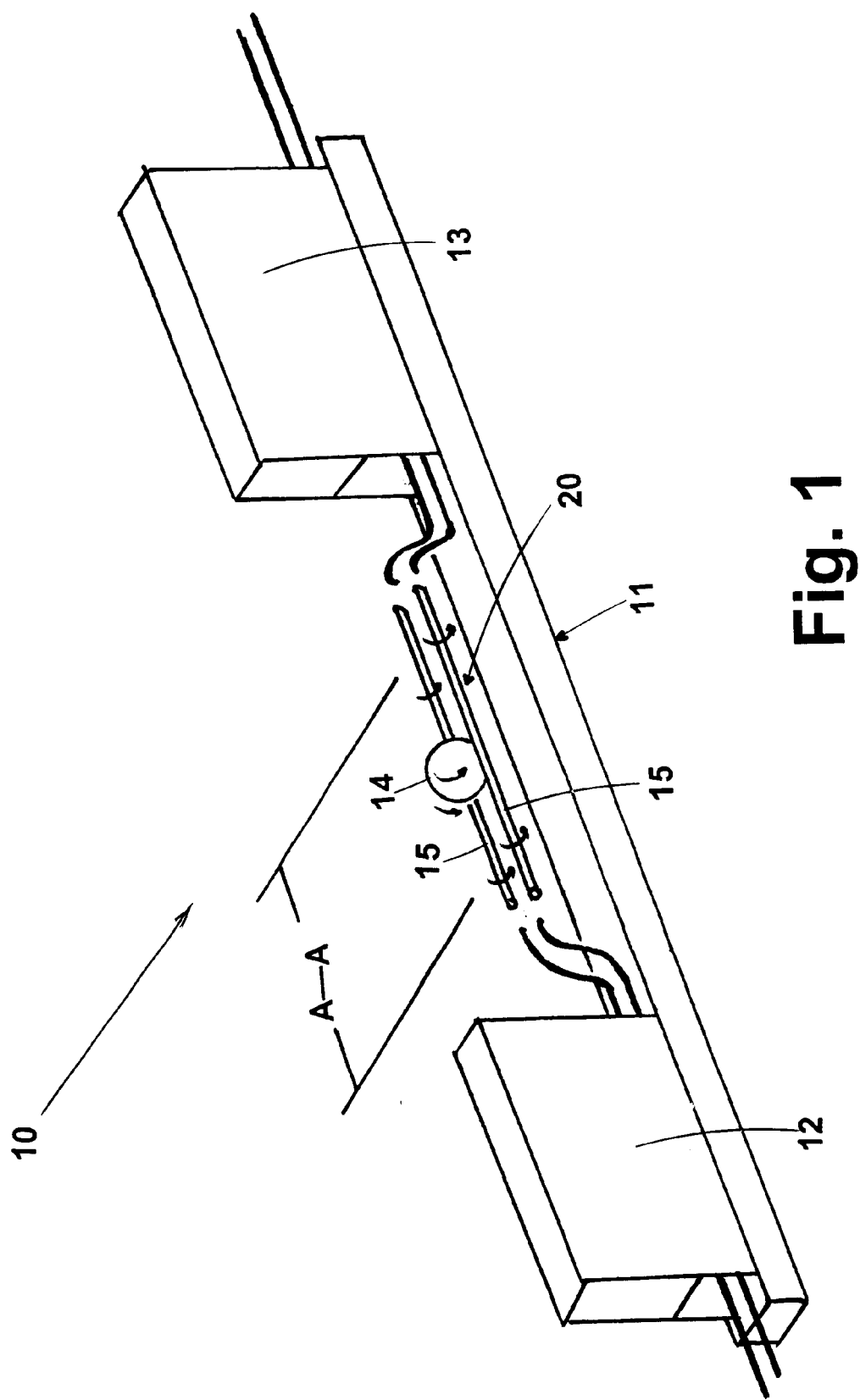
FIG. 1 is a pictorial view of an embodiment of the invention utilizing laser technology to measure the size of a golf ball component at a particular position in the measuring field.

Referring to FIGS. 1–5, an apparatus for monitoring spherical objects is shown, which shall be herein referred to as 10. Apparatus 10 comprises a fixture 11 that has means for translating, rotating and precisely positioning a spherical object, such as a golf ball core 14, wherein the center of core 14 coincides with the center of a laser beam 16 and/or a plurality of vision cameras 18. The laser beam 16 is generated within a measuring field A—A by well-known laser generating m equipment consisting of an emitter 12 and a receiver 13. For the balance of this description the sphere will be referred to as a golf ball core 14, but it is appreciated that the objects to be measured could be other spheres, a golf ball being just one example. In FIGS. 1 to 5, the means for generating power to fixture 11 and placing the fixture into motion is not intricately detailed for clarity purposes, but the inventive concept as to the movement and rotation of core 14 is shown.

In measuring the diameter of a spherical object, it is often assumed that taking the measurement along a couple of planes is sufficient. And often it may be, but in the measurement of golf ball and their cores 14, one measurement for a particular plane, or planes may yield an entirely different value than along another plane. For sophisticated quality control programs it is suggested to make measurements along as many planes as possible. By utilizing high frequency scanning laser technology and/or vision cameras over a measuring field A—A, the present invention provides for precise measurements along multiple axes and planes of golf ball cores 14 at rates exceeding about 20 to 100 cores per minute.

The fixture 11 utilizes simple conventional means, such as gravity, or an aurur to spirally move cores 14 through the field A—A and into the range of laser or vision cameras. Generally, this will be forward rolling motion. Fixture 11 comprises a track 20 having a pair of rotating rails 15. As cores 14 translate through the field A—A, their forward movement combined with the perpendicular rotation placed upon them by the rotating rails, presents a multitude of axes of core 14 for the laser 16 to scan, or for the cameras to take multiple images. A set of sensors (not shown) trigger a controller to start and stop the measuring process as the cores 14 travel in and out of the measuring field A—A. A controller (not detailed) will process the large number of scans/images from multiple planes to give out min/max diameters, out of round and other statistical data for the core 14. The number of scans or images may vary but preferably is about 100 to 200. The process will repeat, as the next core 14 is introduced into the measuring field A—A, generally by means of an automatic load device (not shown). Cores 14 can be mmanually fed without deviating from the inventive concept presented herein. This data can be used for sorting and other quality control process functions.

The emitter 12 and receiver 13 of the laser machinery preferably, produces a continuous wave laser 16, such as gaseous ion lasers (argon-ion, krypton-ion, HeNe), or solid state lasers (diode). Emitter 12 will produce the laser 16 at any power, preferably however <5 mW (in the Class II range). Emitter 12 also defines the optimal measuring field A—A (similar to the focal length of a lens).

Figure 2:
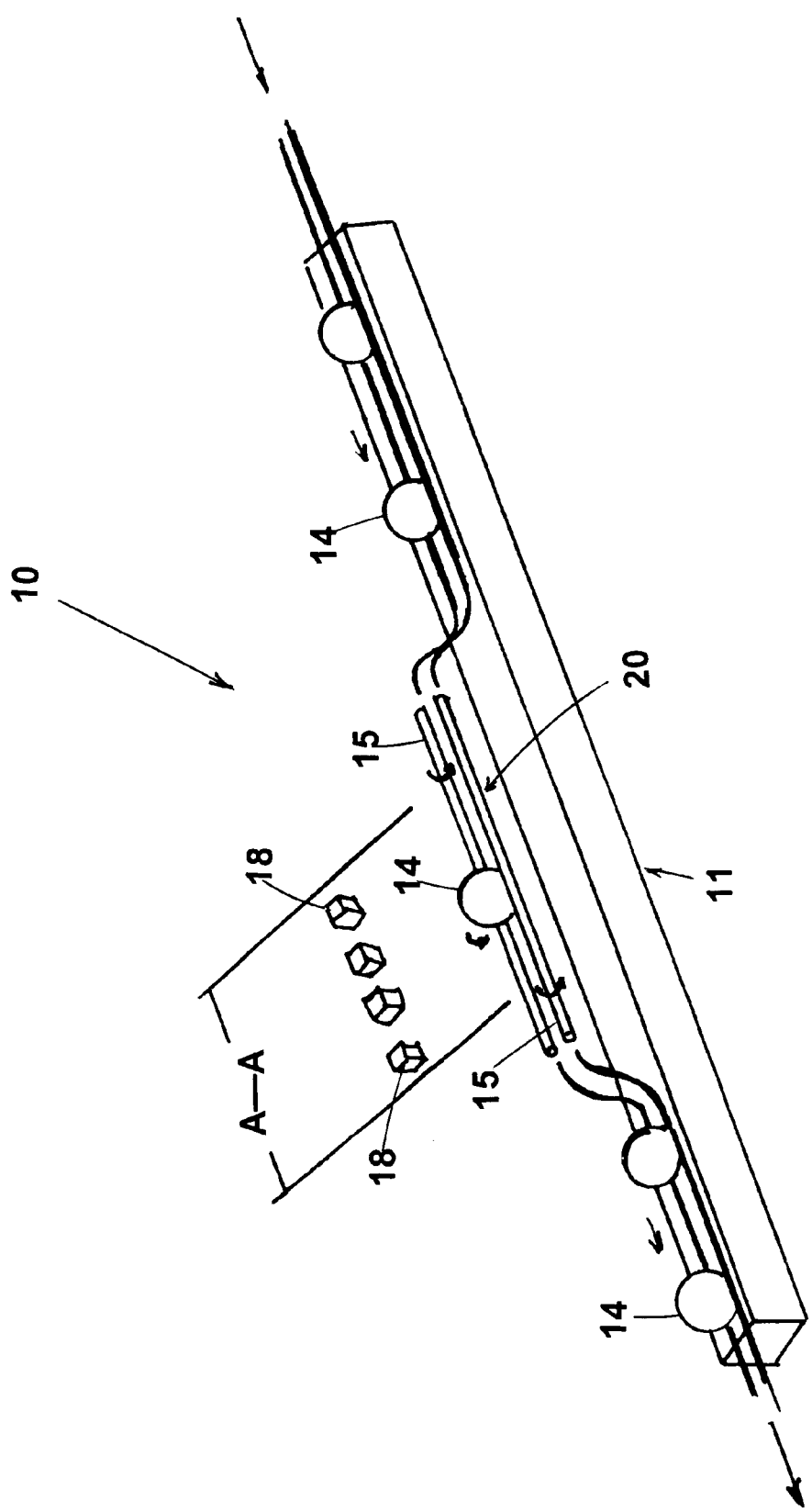
FIG. 2 is a pictorial view of an embodiment of the invention using multiple cameras to measure the size of a plane of a golf ball component at a position in the field of measurement.
Figure 3:
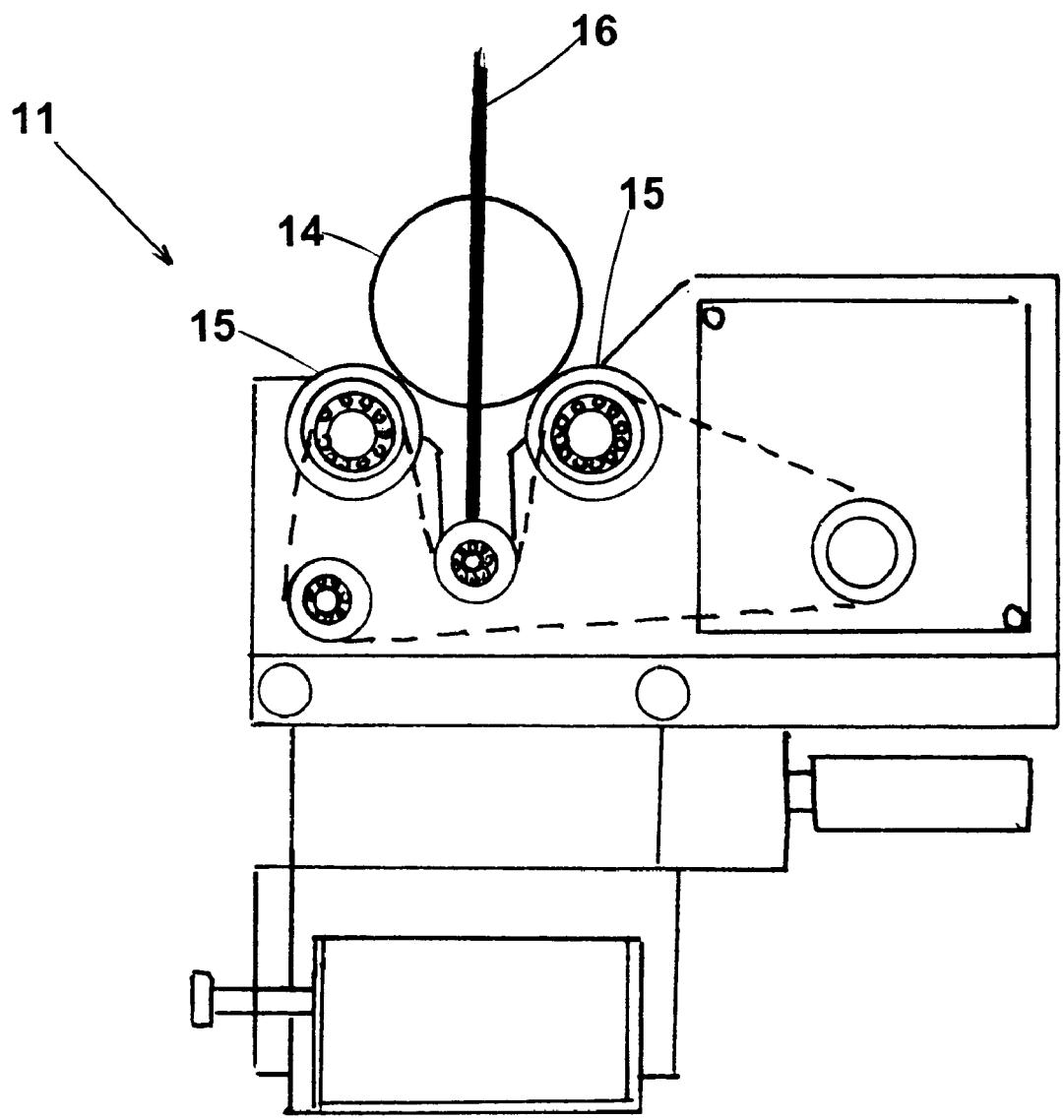
FIG. 3 is an end view of an embodiment of the invention.
Figure 5:
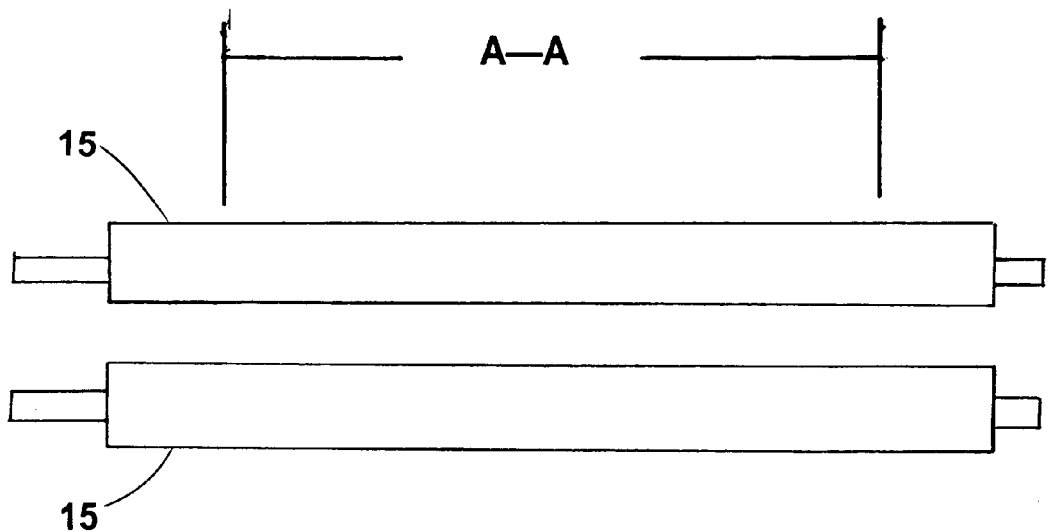
FIG. 5 is a top view of FIG. 4
Figure 4:
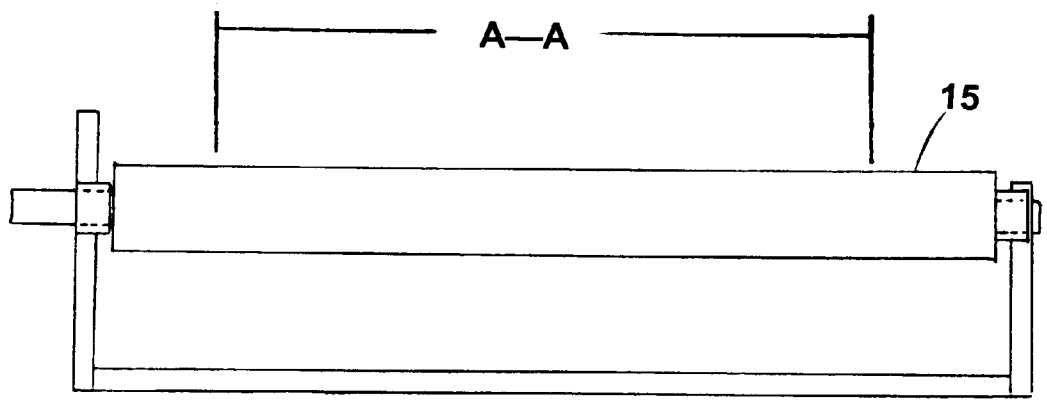
FIG. 4 is a front elevation view of the rails.

Alternatively, as shown in FIG. 2, in addition to or in place of the laser system, vision cameras 18 may be located between the emitter 12 and receiver 13 (if present) at various locations along the measuring field A—A. which is created by a track 20 upon which the cores 14 translate through the field A—A. The vision cameras 18 take images of the rotating cores 14 on CCD (charge coupled device) or other photo-detectors. Receivers and detectors, such as PMT (photo multiplier tube) or CCD photo-detectors are well known to one of ordinary skill in the art, etc.

The method of the present invention for measuring the diameters of a three-dimensional object, such as a golf ball, golf ball center, or golf ball core is to introduce the object, in this case a golf ball core 14, between the emitter 12 and the receiver 13. This may be by manual or automatic feed. Track 20 positions cores co-linear to axis defined by the plane drawn through the emitter/receiver 12/13. Then cores 14 are positioned in such a way that the center of the core 14 intersects with the center of the laser beam 16. The pitch of the track may be increased or decreased (manually or automatically) to adjust the rate of cores through the measuring field A—A. Cores 14 are generally rotated in the direction of their travel as they translate along the axis between the emitter 12 and receiver 13. The rotation of the rails 15, which is in a generally perpendicular direction to that of travel, allows for a multitude of diameters (between 20 and 200) to be exposed for scanning, thereby reducing the possibility of errors normally associated when only a few such measurements are taken. The speed in which the rails 15 rotate within the track 20 can be increased or decreased as desired (increasing allows more axes to be monitored whereas decreasing speed of rotation decreases the number of axes monitored). A trigger is provided, such as a laser beam, photo-eye, etc (not shown), to start and stop the measuring (and processing of scans and/or images) as the cores 14 travel in and out of the measuring field A—A. A controller (not shown) processes the scans/images from the multiple planes and from these measurements, data such as min/max diameters, number out of round, number counted, variance, etc. and other predetermined statistical data is calculated and then can be linked with quality control statistics. The process is repeated as the next core enters measurement field A—A.

High frequency laser equipment such as that which is commercially available from Zumbach Electronics Corp. of Mt. Kisco, N.Y. and Orpund, Switzerland, can be used quite successfully.

The term "about," as used herein in connection with one or more numbers or numerical ranges, should be understood to refer to all such numbers, including all numbers in a range.

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. A method of measuring the size of a golf ball component comprising the steps of:

positioning a laser generating apparatus comprising of an emitter and a receiver, to form a planar measuring field;

moving the golf ball component through the measuring field, such that the measuring field intersects a center of the object;

rotating the golf ball component in multiple directions as the component translates through the measuring field;

scanning a plane of the golf ball component for measuring the size of the component;

providing a Plurality of scans as the golf ball component moves through the measurement field, the golf ball component constantly providing a different plane for scanning due the 360° rotation through the field; and transferring the scans offline for analysis.

2. The method according to claim 1, wherein the golf ball component is a golf ball core.

3. The method according to claim 1, wherein the golf ball component is a golf ball center.

4. The method according to claim 1, wherein the golf ball component is a finished golf ball.

5. The method according to claim 1, wherein the golf ball component is moved through the measuring field on a track comprised of a pair of generally parallel rails, means rotating the rails perpendicularly to the track, wherein, the golf ball component rotates simultaneously through multiple planes.

6. The method according to claim 1, wherein the moving of the golf ball component into the measuring field is done automatically.

7. The method according to claim 1, wherein the moving of the golf ball component into the measuring field is done manually.

8. The method according to claim 1, wherein the laser is a continuous wave laser.

9. The method according to claim 8, wherein the continuous wave laser is an argon-ion, krypton-ion, helium-neon, or diode.

10. The method according to claim 1, wherein the number of diameter planes measured is from about 100 to 200 scans.

11. A method for monitoring a golf ball component comprising the steps of:

moving the golf ball component into and through a measuring field defined by multiple vision cameras defining a first axis;

positioning the axis of translation of the golf ball component perpendicular to the first axis;

rotating the golf ball component as it translates through the measuring field;

imaging a diameter of the golf ball component; and providing a Plurality of images as the golf ball component moves through the measuring field, the golf ball component constantly providing a different plane for imaging due to the 360° rotation through the field; and transferring the images offline for analysis.

12. The method according to claim 11, wherein the vision cameras comprise a CCD or PMT.

13. An apparatus for monitoring a golf ball component, the apparatus comprising:

an emitter and receiver for generating a laser beam and defining a measuring field;

a fixture having a track for automatically translating the golf ball component through the measuring field;

wherein the track comprises a pair of parallel rotating rails located within the measuring field, the rails having means for providing rotational movement to the component supported thereon; and wherein, the golf ball component is positioned co-linearly to an axis defined by a plane through the emitter and receiver, such that the center of the component intersects with the laser beam to produce a component diameter measurement for a multitude of component planes.

14. The apparatus according to claim 13, wherein the laser beam is a continuous wave laser.

15. The apparatus according to claim 14, wherein the continuous wave laser is argon-ion, krypton-ion, helium-neon, or diode.

16. The apparatus according to claim 13, wherein the golf ball component has an axis of translation and the measuring field further comprises a plurality of vision cameras positioned perpendicularly to the axis of translation of the component.

17. The apparatus according to claim 16, wherein the vision cameras comprise a CCD or PMT.

18. The apparatus according to claim 13, wherein the golf ball component is a golf ball core.

19. The apparatus according to claim 13, wherein the golf ball component is a golf ball center.

20. The apparatus according to claim 13, wherein the golf ball component is a golf ball.

\* \* \* \* \*